(12) United States Patent
Wan

(10) Patent No.: US 8,263,705 B2
(45) Date of Patent: Sep. 11, 2012

(54) METHOD FOR PREPARING POLYVINYL ALCOHOL AND POLYVINYL ACETATE LATEX BY USE OF THE BOTTOM RESIDUE FROM VINYL ACETATE PRODUCTION PROCESS

(75) Inventor: Xiaowen Wan, Chongqing (CN)

(73) Assignee: Chongqing Acme Chemical Industry Co., Ltd., Chongqing (CN)

( * ) Notice: Subject to any disclaimer, the term of this patent is extended or adjusted under 35 U.S.C. 154(b) by 0 days.

(21) Appl. No.: 12/902,922

(22) Filed: Oct. 12, 2010

(65) Prior Publication Data
US 2011/0028649 A1 Feb. 3, 2011

Related U.S. Application Data

(63) Continuation of application No. PCT/CN2009/075428, filed on Dec. 9, 2009.

(30) Foreign Application Priority Data

Dec. 12, 2008 (CN) .......................... 2008 1 0183137

(51) Int. Cl.
*C08F 8/00* (2006.01)
(52) U.S. Cl. .......... 525/62; 524/459; 524/503; 524/557; 525/56; 526/202
(58) Field of Classification Search .................. 524/459, 524/557, 503; 525/62, 56; 526/202
See application file for complete search history.

(56) References Cited

U.S. PATENT DOCUMENTS 2,759,914 A * 8/1956 Kenyon et al. .................. 525/62
2,940,948 A * 6/1960 Halbig et al. ................. 524/557

FOREIGN PATENT DOCUMENTS

| CN | 1231296 A | 10/1999 |
| DE | 3408239 | 9/1985 |
| RU | 878761 | 11/1981 |
| WO | WO 2005/039729 A1 | 5/2005 |

OTHER PUBLICATIONS

International Search Report of PCT CN2009//075428 mailed Mar. 18, 2010.

* cited by examiner

*Primary Examiner* — David W Wu
*Assistant Examiner* — Marie Reddick
(74) *Attorney, Agent, or Firm* — McCarter & English, LLP

(57) ABSTRACT

A method for preparing polyvinyl alcohol and polyvinyl acetate latex by use of a kettle bottom residue from vinyl acetate production process includes: distilling a kettle bottom residue of vinyl acetate to obtain a crude acetic acid and a distillation residue; multiple washing the distillation residue with water under boiling condition to obtain a washing residue containing polyvinyl acetate; dissolving a first portion of the washing residue into a first solvent to obtain a first polyvinyl acetate solution; subjecting the first polyvinyl acetate solution to saponification with an alkali aqueous solution; dissolving a second portion of the washing residue into a second solvent; and dispersing the second polyvinyl acetate solution into the polyvinyl alcohol solution, and optionally recovering the solvent to obtain a polyvinyl acetate latex; or adding the second polyvinyl acetate solution into an emulsion reaction system and optionally recovering vinyl acetate, to obtain a polyvinyl acetate latex.

10 Claims, No Drawings

METHOD FOR PREPARING POLYVINYL ALCOHOL AND POLYVINYL ACETATE LATEX BY USE OF THE BOTTOM RESIDUE FROM VINYL ACETATE PRODUCTION PROCESS

CROSS-REFERENCE TO RELATED APPLICATIONS

This application is a continuation of International Patent Application PCT/CN2009/075428, filed on Dec. 9, 2009 and claims priority to Chinese Patent Application 200810183137.X, filed on Dec. 12, 2008. The entire disclosure of both applications is incorporated by reference herein.

FIELD OF THE INVENTION

The present invention relates to a method for recycling a waste generated from vinyl acetate production process, particularly to a method for recycling a kettle bottom residue generated from vinyl acetate rectification process, more particularly to a method for preparing a polyvinyl alcohol and a redispersible latex powder by using a kettle bottom residue of vinyl acetate.

BACKGROUND OF THE INVENTION

Vinyl acetate (VA) is an important chemical product, and its production process comprises a rectification step which usually generates a bottom residue in distillation kettle after the rectification. This bottom residue is a complex viscous tar-like mixture (usually is called as "kettle bottom residue of vinyl acetate", "tar", "pulp black liquid"), comprises polyvinyl acetate and free acetic acid as main components as well as copolymers with functional groups such as carboxyl and hydroxyl groups, and has a strong sharp smell of acetic acid. The Ministry of Environmental Protection of China had listed the bottom residue as "hazardous solid waste". The bottom residue is usually treated in an incineration way by VA preparations. Since the direct combustion thereof may pollute atmosphere, it is required by environmental protection regulations that the bottom residue must be incinerated with a specific oxygen enriched combustion device, which will increase the investment and operation costs of VA preparations. In the meantime, the recyclable resources in the bottom residue are abandoned by incineration as well.

Chinese patent application CN1231296A discloses a method for preparing a vinyl resin from a kettle bottom residue of vinyl acetate. International patent application WO2005/039729A (corresponding to Chinese patent application CN1764494A) under PCT discloses a method for treatment of a kettle bottom residue of vinyl acetate by washing with water repeatedly. Chinese patent application CN1736974A discloses a method for treatment of a kettle bottom residue of vinyl acetate by distillation with a specific distillation kettle.

However, it is still in need to develop methods for recycling a kettle bottom residue of vinyl acetate in order to sufficiently utilize resources, provide more products and reduce environmental pollution.

SUMMARY OF THE INVENTION

The present invention provides a method for preparing a polyvinyl alcohol and a redispersible latex powder by using a kettle bottom residue of vinyl acetate. In one respect, the present invention provides a method for preparing a polyvinyl alcohol. In another respect, the present invention provides a method for preparing a polyvinyl acetate latex.

DETAILED DESCRIPTION OF THE INVENTION

In one respect, the present invention provides a method for preparing a polyvinyl alcohol, comprising:
(1) Distilling a kettle bottom residue of vinyl acetate to obtain a crude acetic acid and a distillation residue;
(2) Multiple washing the distillation residue with water under boiling condition to obtain a washing residue containing polyvinyl acetate;
(3) Dissolving the washing residue into a first solvent to obtain a first polyvinyl acetate solution;
(4) Subjecting the first polyvinyl acetate solution to saponification with an alkali aqueous solution, and recovering the first solvent to obtain a polyvinyl alcohol solution; and optionally, drying the polyvinyl alcohol solution to obtain a polyvinyl alcohol powder.

In another aspect, the present invention provides a method for preparing a polyvinyl acetate latex, comprising:
(1) Distilling a kettle bottom residue of vinyl acetate to obtain a crude acetic acid and a distillation residue;
(2) Multiple washing the distillation residue with water under boiling condition to obtain a washing residue containing polyvinyl acetate;
(3) Dissolving a first portion of the washing residue into a first solvent to obtain a first polyvinyl acetate solution;
(4) Subjecting the first polyvinyl acetate solution to saponification with an alkali aqueous solution to obtain a polyvinyl alcohol solution;
(5) Dissolving a second portion of the washing residue into a second solvent to obtain a second polyvinyl acetate solution;
(6) Dispersing the second polyvinyl acetate solution into the polyvinyl alcohol solution, and optionally recovering the solvent to obtain a polyvinyl acetate latex; or adding the second polyvinyl acetate solution into an emulsion reaction system containing the polyvinyl alcohol solution, an emulsifier, vinyl acetate and an initiator and reacting, optionally recovering vinyl acetate, to obtain a polyvinyl acetate latex.

According to one embodiment of the present invention, in the step (2), the weight ratio of the distillation residue to water used for per run of washing is 1:0.1-0.9, preferably 1:0.3-0.5.

According to another one embodiment of the present invention, the first solvent in the step (3) is a water-soluble organic solvent capable of dissolving polyvinyl acetate, for example, water-soluble organic solvents having a low boiling point and being easy to be separated and recovered from water phase, such as methanol, ethanol and so on, and the weight ratio of the washing residue to the first solvent is 1:1.5-2.5.

According to further another one embodiment of the present invention, the alkali aqueous solution in the step (4) is one of or a mixture solution of sodium hydroxide aqueous solution, potassium hydroxide aqueous solution, sodium carbonate aqueous solution, potassium aqueous solution, sodium bicarbonate aqueous solution, and the weight ratio of the non-volatile substance in the first polyvinyl acetate solution to the alkali (dry weight) is 1:0.1-0.4.

According to one embodiment of the present invention, the second solvent in the step (5) is an organic solvent capable of dissolving polyvinyl acetate, preferably an organic solvent having a low boiling point and being easy to be separated by distillation from water phase, such as benzene, vinyl acetate, etc., and the weight ratio of the washing residue to the second solvent is 1:2-10, preferably 1:4-6.

According to one embodiment of the present invention, in the step (6), the second polyvinyl acetate solution is dispersed in the polyvinyl alcohol solution by a mechanical way, in which the solid content of the polyvinyl alcohol solution can be adjusted in advance to 4-8%, preferably 5-6%, and the ratio of the second polyvinyl acetate solution to the polyvinyl alcohol can be 1:0.05-0.12, preferably 1:0.08-0.10 (calculated according to solid contents thereof).

In the above methods, the first solvent can be a water-soluble organic solvent capable of dissolving polyvinyl acetate resin, for example, an organic solvent having a low boiling point and being easy to be separated from water phase, such as methanol, etc. (the resultant first polyvinyl acetate solution can also be called as "methanol-polyvinyl acetate resin solution"). The second solvent has a low boiling point and is water-insoluble and easy to be recovered by distillation from a mixture with water, for example, benzene, etc. (the resultant second polyvinyl acetate solution can also be called as "benzene-polyvinyl acetate resin solution"). The second solvent can also be vinyl acetate monomer (the resultant second polyvinyl acetate solution can also be called as "monomer-polyvinyl acetate resin solution").

In the step (1), the distillation can be an atmospheric distillation or a reduced pressure distillation. The distillation can be performed in a common acid-resistant distiller under conventional conditions. In general, the distillation stops when the temperature reaches 120° C. and no more crude acetic acid is distilled off (for example, the distillation stops when the time interval of two continuous drops of crude acetic acid is equal to or greater than 2-5 seconds).

In the step (2), the water used for washing can be neutral water, tap water or deionized water. The washing water can be heated to reach boiling temperature in advance, then added to the distillation residue. The washing is performed under boiling conditions. The term "boiling" is also called as "ebullition", referring to a vigorous vaporization phenomenon simultaneously occurring at the surface and inside of the residue. The boiling temperature may vary according to the pressure and the composition of the distillation residue. For example, along with the increase of water-soluble components in the distillation residue, the boiling temperature may increase as well. Typically, the boiling temperature is usually greater than 100° C.

After the washing under boiling condition is performed for a time period, such as 10, 20 or 30 minutes, the washing water is discharged. The washing is performed for several times until the discharged washing water has a pH of 4-6. Typically, the washing number is preferably 5-6. The weight ratio of the distillation residue to the water used for per run of washing is 1:0.3-0.5. For example, the weight ratio for the first run of washing can be 1:0.5, and can be 1:0.3 for the following runs. After the washing water for the first run of washing is discharged, an amount of alkali aqueous solution (e.g., lime milk) can be added to adjust pH to 9-9.5, and then a salt of acetic acid such as calcium acetate can be recovered by evaporation. The washing water discharged in the second and later runs can be used for washing the next batch of distillation residue.

WO2005/039729A discloses that a kettle bottom residue of vinyl acetate is washed with water at 80-100° C. Since the kettle bottom residue of vinyl acetate contains a relatively large amount of acetic acid and thus has an elevated boiling point, the washing is actually performed under non-boiling conditions even the washing temperature is 100° C. In fact, the inventor of the present invention found that the kettle bottom residue of vinyl acetate and water may form a slurry under boiling conditions which renders it difficult to separate the washing water and thus the washing can hardly be completed.

The inventor of the present invention further found that the distillation residue which is obtained after distilling the kettle bottom residue of vinyl acetate can be washed with water under boiling conditions, and the washing water can be readily separated, and both of the amount of water for per washing and the total washing number can also be significantly reduced. In addition, since the mixing effect of boiling significantly enhances the contact between the washing water and the distillation residue thereby improving the heat and mass transfer, the additional mechanical agitation can be reduced.

In the steps (3) and (5), the dissolution can be performed at room temperature under stirring by adding the first or second solvent to the washing residue. The first polyvinyl acetate solution such as methanol-polyvinyl acetate resin solution can have a solid content of 20-40%. The second polyvinyl acetate solution such as benzene-polyvinyl acetate resin solution can have a solid content of 18-25%.

In the step (4), the alkali aqueous solution can be one of or a mixture solution of sodium hydroxide aqueous solution, potassium hydroxide aqueous solution, sodium carbonate aqueous solution, potassium aqueous solution, sodium bicarbonate aqueous solution. The concentration of the alkali aqueous solution can be from 10% to a saturated concentration. The weight ratio of the non-volatile substance in the methanol-polyvinyl acetate resin solution to the alkali (dry weight) can be 1:0.1-0.3. Taking sodium carbonate as example, the weight ratio of the non-volatile substance in the methanol-polyvinyl acetate resin solution to the alkali can be 1:0.15-0.3. The saponification can be performed in solvent at refluxing temperature. The end of saponification is that one drop of the reactant is mixable with infinite tap water. Generally, the temperature of the saponification can be determined according to the boiling point of the used solvent. After the saponification, the product is a polyvinyl alcohol solution. The polyvinyl alcohol solution can be mixed with an amount of deionized water to adjust concentration, then optionally evaporated to recover the solvent. The recovered solvent can be recycle used. The polyvinyl alcohol solution can be directed used as a product, or as a semi-finished product, i.e., a protective colloid of latex for standby use.

The polyvinyl alcohol solution can be dried to obtain a polyvinyl alcohol powder product by a conventional spray drying method. The polyvinyl alcohol powder product can be further admixed with, if desired, various additives, such as pigments (such as titanium dioxide), dispersing aid (superfine attapulgite clay), loosing agent (such as talc powder), etc., and these additives can be added before the polyvinyl alcohol is dried, except that the loosing agent would be added after the drying.

In the step (6), the preparation of polyvinyl acetate latex can be carried out by the following two methods.

The first method comprises: dispersing the second polyvinyl acetate solution such as benzene-polyvinyl acetate resin solution or monomer-polyvinyl acetate resin solution into the polyvinyl alcohol solution by a mechanical way. The solid content of the polyvinyl alcohol solution can be adjusted to 5-6% in advance, and the solid substance ratio of the second polyvinyl acetate solution such as benzene-polyvinyl acetate resin solution or monomer-polyvinyl acetate resin solution to the polyvinyl alcohol solution can be 1:0.08-0.1. Without being limited to any theory, it is considered that when the second polyvinyl acetate solution such as benzene-polyvinyl acetate resin solution or monomer-polyvinyl acetate resin solution is mixed with water phase, the polyvinyl acetate in the solution precipitates out, the precipitated polyvinyl acetated is sheared by mechanical force to form fine particles and thus dispersed in the polyvinyl alcohol protective colloid. After the end of mechanical dispersion, the second solvent such as benzene or monomer is optionally recovered by distillation. The recovered solvent such as benzene or monomer can be reused. In the polyvinyl acetate latex, further aids and additives, such as toughening agent, pigment, dispersing aid, can be added.

The second method comprises: adding slowly the second polyvinyl acetate solution such as monomer-polyvinyl acetate resin solution into a system containing the polyvinyl alcohol solution, an emulsifier, vinyl acetate and an initiator, reacting with the synchronous addition of initiator, in which the emulsifier can be any surfactant suitable for emulsion polymerization, such as OP-10, etc. The initiator can be any initiator suitable for emulsion polymerization, such as sodium persulfate, potassium persulfate, ammonium persulfate or a mixture thereof.

The emulsion polymerization can be carried out at the refluxing temperature of monomer, such as 68-72° C. After the end of the emulsion polymerization, the second solvent and/or vinyl acetate monomer can be optionally recovered. The recovered second solvent and/or acetate vinyl can be reused. After recovery, a polyvinyl acetate latex is obtained. In the polyvinyl acetate latex, further aids and additives such as toughening agent, pigment, dispersing agent can be added.

In order to improve the comprehensive properties of the product, other polymer latexes such as polyacrylate latex, polyurethane latex, VAE latex, or a latex prepared by dissolving the polyvinyl acetate of the present invention and other polymers such as EVA resin simultaneously can be added to the polyvinyl acetate latex to obtain a blend-type latex.

The polyvinyl acetate latex can be directly used as a product, or a semi-finished product for making a latex powder.

The polyvinyl acetate latex can be dried to form a redispersible latex powder product by a conventional spray drying method. Before the drying to form the redispersible latex powder, if desirable, various additives such as polyvinyl alcohol solution, pigments (such as titanium dioxide), dispersing aids (such as white carbon black, calcium carbonate) and other aids can be added.

The above products have many uses such as those appearing below.

Polyvinyl alcohol solution or powder: useful in resisting mineral oils (such as gasoline-resistant pipelines), greases, lubricants; mainly useful in preparing polyvinyl acetal; also useful in adhesives for fabrics and leathers, emulsifier, dispersant and protective colloid in chemical industries; or useful as soil conditioner in agriculture.

Polyvinyl acetate latex: having good performance to adhere bamboo, wood, paper, fabric, foam plastics, etc., useful in adhering various wood-based panels and preparing furniture; useful in interior decoration; useful in paper articles and packaging; and useful as matrix material in water-borne coatings, water-borne paste.

Redispersible latex powder: useful in enhancing strength of cement mortar in building construction, forming an insulation layer of outdoor cement mortar, hardening cement articles; or useful in a latex form by adding water and stirring; advantageous in low cost of package, transportation and storage and easy to use.

According to the method of the present invention, the kettle bottom residue of vinyl acetate is treated to recover crude acetic acid and obtain polyvinyl alcohol and redispersible latex powder products which have remarkable properties and low price. From the views of environmental protection and safety, these products are nontoxic and meet the requirements of environmental protection and safety.

In comparison with the prior art, the advantages of the method of the present invention lie in: reducing water-washing number thereby saving water, energy consumption and working time. In addition, the kettle bottom residue of vinyl acetate is treated to obtain many products at a low cost, including crude acetic acid, acetates, polyvinyl alcohol protective colloid, polyvinyl alcohol powder, polyvinyl acetate latex, redispersible latex powder, etc. Hence, the method of the present invention has remarkable environmental protection benefits and economic benefits.

EXAMPLE 1

Preparing Polyvinyl Alcohol by Using a Kettle Bottom Residue of Vinyl Acetate 400 g of a kettle bottom residue of vinyl acetate was added to a 2000 ml flask, heated in an oil-bath, distilled at a reduced pressure which started at 0.001 MPa and was gradually elevated up to 0.08 MPa according to the temperature and boiling condition in the flask, then kept at 120° C., the distillation stopped when no more crude acetic acid was distilled off (the distillation end was that the time interval of two continuous drops of acetic acid was greater than 2 seconds). Then, the apparatus on the flask for cooling and recovering acetic acid was changed into an apparatus for cooling and refluxing organic solvent.

400 g of boiling water (tap water) was poured into the flask, the distillation residue was stirred and washed under boiling condition of $\geq 100°$ C. for 30 min, and then the washing water was discharged. The washing under boiling condition was repeated for 5 times (240 g of boiling water was added in each of the $2^{nd}$ to $5^{th}$ runs of washing). The acidic washing water discharged in the $1^{st}$ run of washing was neutralized with lime cream to reach a pH of 9.0-9.5, and then heated for evaporation to recover calcium acetate. The washing water discharged in the $2^{nd}$, $3^{rd}$, $4^{th}$ and $5^{th}$ runs was stored and reused in washing the next batch of distillation residue. The pH of the washing water of the $5^{th}$ run was detected as 5.

After five runs of washing under boiling condition, the washing water was discharged. 450 g of methanol was added slowly into the flask under stifling, and the stifling was kept until the washed distillation residue (mainly containing polyvinyl acetate resin) of the kettle bottom residue of vinyl acetate was dissolved completely. The solid content thereof was detected and adjusted to 35%. Then 30% sodium carbonate aqueous solution was added in a weight ratio of the solid to sodium carbonate of 100:18.

The temperature was elevated so that the methanol in the flask was refluxed, and the reaction was performed at 69-72° C. for 3 h. When the detection showed that one drop of reactant was mixable with infinite tap water, the reaction stopped. Then 500 g of deionized water was added into the flask, methanol was recovered by distillation. After the recovery of methanol, more deionized water was added to form a polyvinyl alcohol aqueous solution with a non-volatile content of 25%, which was then cooled to below 50° C. and filtrated for standby use.

Into 2000 g of 25% polyvinyl alcohol aqueous solution, 100 g of cellulose and 50 g of titanium dioxide were added and stirred for homogenization, then a conventional spray drying was conducted in which 50 g of nanometer superfine attapulgite clay was added via a cold air inlet, and the obtained composite polyvinyl alcohol powder was collected.

EXAMPLE 2

A polyvinyl alcohol protective colloid with a solid content of 6% was prepared by using the 25% polyvinyl alcohol solution of Example 1 and deionized water.

Preparing monomer-polyvinyl acetate resin solution or benzene-polyvinyl acetate resin solution 400 g of a kettle bottom residue of vinyl acetate was added to a 1000 ml flask, heated in an oil-bath, distilled at a reduced pressure which started at 0.001 MPa and was gradually elevated up to 0.08 MPa according to the temperature and boiling condition in the flask, then kept at 120° C., the distillation stopped when no more crude acetic acid was distilled off (the distillation end was that the time interval of two continuous drops of acetic acid was greater than 2 seconds).

400 g of boiling water (tap water) was poured into the flask, the distillation residue was stirred and washed under boiling condition of $\geqq 100°$ C. for 30 min, and then the washing water was discharged. The washing under boiling condition was repeated for 5 times (240 g of boiling water was added in each of the $2^{nd}$ to $5^{th}$ runs of washing). The acidic washing water discharged in the $1^{st}$ run of washing was neutralized with lime cream to reach a pH of 9.0-9.5, and then heated for evaporation to recover calcium acetate. The washing water discharged in the $2^{nd}$, $3^{rd}$, $4^{th}$ and $5^{th}$ runs was stored and reused for washing the next batch of distillation residue. The pH of the washing water of the $5^{th}$ run was detected as 5. Then, the cooling and recovering apparatus on the flask was changed into an apparatus for cooling and refluxing organic solvent. 400 g of vinyl acetate monomer was added slowly under stirring, and the stirring was kept until the washed distillation residue (mainly containing polyvinyl acetate resin) of the kettle bottom residue of vinyl acetate was dissolved completely to obtain a monomer-polyvinyl acetate resin solution with a non-volatile content of 20%, which was cooled to room temperature and filtrated for standby use.

By using the same method of the step (2), 400 g of benzene was used to replace vinyl acetate monomer to prepare a benzene-polyvinyl acetate resin solution with a non-volatile content of 20%.

EXAMPLE 3

Preparation of Polyvinyl Acetate Latex 300 g of the 6% polyvinyl alcohol protective colloid of Example 2, 2.6 g of OP-10 emulsifier, 1.8 ml of 10% ammonium persulfate aqueous solution, 30 g of vinyl acetate were added to a 2000 ml flask, the temperature was elevated under stirring, the reaction was performed under refluxing to 70° C., then 900 g of the monomer-polyvinyl acetate resin solution with a solid content of 20% of Example 2 was slowly added dropwise, and 18 ml of 10% ammonium persulfate aqueous solution was added slowly and synchronously, the addition was finished within 8 h. The temperature was kept at 70° C. for 20 min, and then vinyl acetate was recovered by distillation. After the end of recovery by distillation (85° C.), the temperature dropped to 45° C., then 20 g of toughening agent was added and stirred for 30 min, thereby obtaining 446 g of polyvinyl acetate latex with a solid content of 45%.

EXAMPLE 4

Preparing of Polyvinyl Acetate Latex (Dispersion Type)

Into a 2000 ml flask, 300 g of the 6% protective colloid aqueous solution of Example 2 was added. Under room temperature and mechanical agitation, 900 g of the benzene-polyvinyl acetate resin solution with a solid content of 20% of Example 2 was slowly added dropwise within 8 h. After the end of addition, the stirring was kept for 10 min. Benzene was then recovered by distillation. After the recovery by distillation (88° C.), 20 g of toughening agent was added and stirred for 30 min, thereby obtaining 440 g of a polyvinyl acetate latex with a solid content of 45%.

EXAMPLE 5

Preparation of Redispersible Latex Powder 1800 g of the polyvinyl acetate latex with a solid content of 45% of Example 3, 600 g of the 25% polyvinyl alcohol aqueous solution of Example 1, 50 g of cellulose, 100 g of titanium dioxide, 50 g of white carbon black and 50 g of calcium carbonate were stirred and homogenized together, then subjected to a conventional spray drying. 15 g of superfine talc powder as loosing agent was added via a cold air inlet and mixed homogeneously, and a redispersible latex powder of polyvinyl acetate was collected.

EXAMPLE 6

Preparation of Redispersible Latex Powder

By using the same method and materials of Example 5, except that the 1800 g of polyvinyl acetate latex was replaced with a mixture of 1200 g of the polyvinyl acetate latex prepared by Example 3 and 600 g of polyacrylate latex, a redispersible latex powder with improved performance was obtained.

EXAMPLE 7

Preparation of Redispersible Latex Powder 1800 g of the polyvinyl acetate latex with a solid content of 45% of Example 4, 600 g of the 25% polyvinyl alcohol aqueous solution of Example 1, 50 g of cellulose, 100 g of titanium dioxide, 50 g of white carbon black and 50 g of calcium carbonate were stirred and homogenized together, then subjected to a conventional spray drying. 15 g of superfine talc powder as loosing agent was added via a cold air inlet and mixed homogeneously, and a redispersible latex powder of polyvinyl acetate was collected.

The method of the present invention for preparing polyvinyl alcohol and redispersible latex powder by using a kettle bottom residue of vinyl acetate is described above in detail, and the principle and embodiments of the present invention are illustrate by the specific examples. However, the examples are merely to help understanding the method and spirit of the present invention. In the meantime, an ordinary technical in the art is able to modify the embodiments and applications of the present invention according to the spirit of the present invention. In sum, the contents of the specification do not intend to limit the protection scope of the present invention.

What is claimed is:

1. A method for preparing a polyvinyl alcohol, comprising:
   i. distilling a kettle bottom residue of vinyl acetate to obtain a crude acetic acid and a distillation residue;
   ii. washing the distillation residue with water under boiling conditions several times until a discharged washing water has a pH of 4-6 to obtain a washing residue containing polyvinyl acetate;
   iii. dissolving the washing residue into a first solvent to obtain a first polyvinyl acetate solution; and
   iv. subjecting the first polyvinyl acetate solution to saponification with an alkali aqueous solution, and recovering the first solvent to obtain a polyvinyl alcohol solution; and optionally, drying the polyvinyl alcohol solution to obtain a polyvinyl alcohol powder.

2. The method according to claim 1, wherein the weight ratio of the distillation residue to water used per washing is 1:0.1-0.9.

3. The method according to claim 1, wherein the first solvent in the step (iii) is methanol or ethanol, and the weight ratio of the washing residue to the first solvent is 1:1.5-2.5.

4. The method according to claim 1, wherein the alkali aqueous solution in the step (iv) is one of sodium hydroxide aqueous solution, potassium hydroxide aqueous solution, sodium carbonate aqueous solution, potassium aqueous solution, sodium bicarbonate aqueous solution, and a mixed solution of two or more thereof, and the weight ratio of a non-volatile substance in the first polyvinyl acetate solution to the alkali (dry weight) is 1:0.1-0.4.

5. A method for preparing a polyvinyl acetate latex, comprising:
   i. distilling a kettle bottom residue of vinyl acetate to obtain a crude acetic acid and a distillation residue;
   ii. washing the distillation residue with water under boiling conditions several times until a discharged washing water has a pH of 4-6 to obtain a washing residue containing polyvinyl acetate;
   iii. dissolving a first portion of the washing residue into a first solvent to obtain a first polyvinyl acetate solution;
   iv. subjecting the first polyvinyl acetate solution to saponification with an alkali aqueous solution to obtain a polyvinyl alcohol solution;
   v. dissolving a second portion of the washing residue into a second solvent to obtain a second polyvinyl acetate solution; and
   vi. dispersing the second polyvinyl acetate solution into the polyvinyl alcohol solution, and optionally recovering the solvent to obtain a polyvinyl acetate latex; or adding the second polyvinyl acetate solution into an emulsion reaction system containing the polyvinyl alcohol solution, an emulsifier, vinyl acetate and an initiator and reacting, optionally recovering vinyl acetate, to obtain a polyvinyl acetate latex.

6. The method according to claim 5, wherein the second solvent in the step (v) is benzene or vinyl acetate, and the weight ratio of the washing residue to the second solvent is 1:2-10.

7. The method according to claim 5, wherein the second polyvinyl acetate solution is dispersed in the polyvinyl alcohol solution by a mechanical way, wherein the solid content of the polyvinyl alcohol solution is adjusted in advance to 4-8%, and the ratio of the second polyvinyl acetate solution to the polyvinyl alcohol is 1:0.05-0.12 expressed in solid content.

8. The method according to claim 5, wherein the weight ratio of the distillation residue to water used per washing is 1:0.1-0.9.

9. The method according to claim 5, wherein the first solvent in the step (iii) is methanol or ethanol, and the weight ratio of the washing residue to the first solvent is 1:1.5-2.5.

10. The method according to claim 5, wherein the alkali aqueous solution in the step (iv) is one of sodium hydroxide aqueous solution, potassium hydroxide aqueous solution, sodium carbonate aqueous solution, potassium aqueous solution, sodium bicarbonate aqueous solution, and a mixed solution of two or more thereof, and the weight ratio of a non-volatile substance in the first polyvinyl acetate solution to the alkali (dry weight) is 1:0.1-0.4.

* * * * *